(12) United States Patent
Chiang et al.

(10) Patent No.: US 12,509,377 B2
(45) Date of Patent: Dec. 30, 2025

(54) CHEMICAL SEWAGE TREATMENT AND REUSE SYSTEM

(71) Applicant: SHANGHAI YINGSHAN ENVIRONMENTAL PROTECTION TECHNOLOGY CO., LTD., Shanghai (CN)

(72) Inventors: Ming-Hui Chiang, Shanghai (CN); Ying-Hsuan Chiang, Shanghai (CN)

(73) Assignee: Shanghai Yingshan Environmental Protection Technology Co., Ltd., Shanghai (CN)

( * ) Notice: Subject to any disclaimer, the term of this patent is extended or adjusted under 35 U.S.C. 154(b) by 370 days.

(21) Appl. No.: 18/253,403

(22) PCT Filed: Dec. 20, 2021

(86) PCT No.: PCT/CN2021/139616
§ 371 (c)(1),
(2) Date: May 18, 2023

(87) PCT Pub. No.: WO2022/143256
PCT Pub. Date: Jul. 7, 2022

(65) Prior Publication Data
US 2024/0002267 A1    Jan. 4, 2024

(30) Foreign Application Priority Data

Dec. 31, 2020    (CN) .......................... 202011624519.9

(51) Int. Cl.
*C02F 3/12*    (2023.01)
*C02F 3/00*    (2023.01)
*C02F 3/30*    (2023.01)

(52) U.S. Cl.
CPC .......... *C02F 3/1268* (2013.01); *C02F 3/1284* (2013.01); *C02F 3/30* (2013.01);
(Continued)

(58) Field of Classification Search
CPC ............ C02F 2003/008; C02F 2209/02; C02F 2209/06; C02F 3/1268; C02F 3/1284;
(Continued)

(56) References Cited

U.S. PATENT DOCUMENTS

| 8,211,316 | B2 | 7/2012 | Chiang | |
| 2009/0272687 | A1* | 11/2009 | Chiang | C02F 3/30 210/605 |

FOREIGN PATENT DOCUMENTS

| AU | 2020100706 A4 * | 6/2020 | ............... C02F 3/30 |
| CN | 1944293 A | 4/2007 | |

(Continued)

OTHER PUBLICATIONS

Mao et al, CN 101538100, English machine translation, pp. 1-4 (Year: 2009).*

(Continued)

*Primary Examiner* — Claire A Norris
(74) *Attorney, Agent, or Firm* — Alston & Bird LLP

(57) ABSTRACT

Disclosed is a chemical wastewater treatment and reuse system, which corresponds to a raw water tank and includes a regulation tank pretreatment system, an A/A/O biological treatment system, an MBR treatment system and an electrical control system. The regulation tank pretreatment system includes a grating tank, a primary sedimentation tank and a regulation tank that sequentially communicate with the raw water tank. The A/A/O biological treatment system includes an anaerobic tank group and an aerobic tank group that sequentially communicate with the regulation tank. The MBR treatment system includes a separation tank and a membrane tank that sequentially communicate with the aerobic tank group, the membrane tank communicates with a clarification tank, and the membrane tank and the clarification tank jointly communicate with the sedimentation tank. The sedimentation tank sequentially communicates (Continued)

with a clear water tank, a discharge tank, an advanced treatment tank and a reused water tank.

18 Claims, 2 Drawing Sheets

(52) U.S. Cl.
 CPC .. *C02F 2003/008* (2013.01); *C02F 2203/006* (2013.01); *C02F 2209/005* (2013.01); *C02F 2209/02* (2013.01); *C02F 2209/06* (2013.01)

(58) Field of Classification Search
 CPC .... C02F 3/30; C02F 9/00; C02F 1/001; C02F 1/02; C02F 1/66; C02F 2001/007; C02F 2203/006; C02F 2209/005; C02F 3/006
 USPC ......................................................... 210/605
 See application file for complete search history.

(56) References Cited

FOREIGN PATENT DOCUMENTS

| | | |
|---|---|---|
| CN | 101538100 A | 9/2009 |
| CN | 205528224 U | 8/2016 |
| CN | 206051806 U | 3/2017 |
| CN | 108996831 A | 12/2018 |
| CN | 109292971 A | 2/2019 |
| CN | 209493446 U | 10/2019 |
| CN | 111252994 A | 6/2020 |
| CN | 211226554 U | 8/2020 |
| CN | 211814017 U | 10/2020 |
| CN | 212102459 U | 12/2020 |
| CN | 112645544 A | 4/2021 |
| CN | 218115216 U | 12/2022 |
| JP | H11-347550 A | 12/1999 |

OTHER PUBLICATIONS

International Search Report received for International Patent Application No. PCT/CN2021/139616, mailed on Mar. 18, 2022, 6 pages (English Translation included).

Chinese Office Action for Application No. 202011624519.9, dated Oct. 22, 2024, 10 pages.

Chinese Office Action for Application No. 202011624519.9, dated Mar. 6, 2025, 12 pages.

* cited by examiner

CHEMICAL SEWAGE TREATMENT AND REUSE SYSTEM

CROSS REFERENCE TO RELATED APPLICATIONS

This application is a National Stage Application, filed under 35 U.S.C. § 371, of International Application No. PCT/CN2021/139616, filed Dec. 20, 2021, which international application claims priority to and the benefit of Chinese Application No. 202011624519.9, filed Dec. 31, 2020; the contents of both of which as are hereby incorporated by reference in their entireties.

BACKGROUND

Technical Field

The present disclosure relates to the technical field of sewage treatment, in particular to a chemical sewage treatment and reuse system.

Description of Related Art

With the improvement of environmental protection requirements in China, the water-based environmental-friendly coatings market is developing rapidly, and acrylic emulsions, as raw materials for water-based coatings, are also greatly increasing in demand with the development of the market.

In the production process of acrylic resin, the main sources of wastewater are equipment cleaning wastewater, filter cloth cleaning wastewater, laboratory wastewater, floor cleaning wastewater and RTO (Regenerative Thermal Oxidizer) flue spray wastewater, with main pollutants of $CODcr$, $BOD5$, SS, etc., and thus the wastewater belongs to high-concentration organic wastewater. The wastewater without effective treatment may cause the burden of downstream wastewater treatment enterprises, and may result in pollution of the surrounding environment.

In order to protect the water sources and ecological environment and promote the sustainable development of chemical industry and coating industry, how to collect and effectively treat various wastewater in the factory area has become an urgent problem to be solved.

BRIEF SUMMARY

For the shortcomings in the prior art, a chemical sewage treatment and reuse system is provided to solve the defects in the prior art.

In order to achieve the objective above, the present disclosure provides the following solution:

A chemical sewage treatment and reuse system corresponds to a raw water tank, and includes a regulation tank pretreatment system, an A/A/O biological treatment system, an MBR treatment system, and an electrical control system. The regulation tank treatment system includes a grating tank, a primary sedimentation tank and a regulation tank which communicate with the raw water tank in sequence. The A/A/O biological treatment system includes an anaerobic tank group and an aerobic tank group which communicate with a regulation tank in sequence. The MBR (Membrane bio-reactor) treatment system includes a separation tank and a membrane tank which are sequentially connected to the aerobic tank group, the membrane tank communicates with a clarification tank, and the membrane tank and the clarification tank jointly communicate with the sedimentation tank. The sedimentation tank communicates with a clear water tank, a discharge tank, an advanced treatment tank and a reused water tank in sequence. The electrical control system includes a plurality of sub-controllers, each tank corresponds to a sub-controller, and all sub-controllers are connected to a master controller.

In a preferred solution, the system further includes an aerator, the aerator communicates with the bottom of the primary sedimentation tank, the bottom of the aerobic tank and the bottom of the membrane tank through a pipeline; and the aerator is connected to one sub-controller.

In a preferred solution, the system further includes a sludge concentration tank, which communicates with the primary sedimentation tank, the anaerobic tank group and the separation tank through a pipeline.

In a preferred solution, the sludge is returned to the aerobic tank from the separation tank, the membrane tank, the clarification tank, the sedimentation tank, the clear water tank, the discharge tank, the advanced treatment tank and the reused tank in the system through pipelines.

In a preferred solution, the regulation tank is internally provided with a heat exchanger and a regulation tank lifting pump. The heat exchanger communicates with an external heat source, and the regulation tank lifting pump communicates with a pipeline and then communicates with an anaerobic tank.

In a preferred solution, the anaerobic tank group includes five anaerobic tanks which are in communication in sequence. The first anaerobic tank is internally provided with an automatic pH regulator, a submersible agitator, an anaerobic sludge return pump and an ABR (Anaerobic baffled reactor) reactor, and the rest anaerobic tanks each are internally provided with a submersible agitator, an anaerobic sludge return pump and an ABR reactor. All anaerobic sludge return pumps communicate with pipelines and then communicate with the sludge concentration tank.

In a preferred solution, the aerobic tank is internally provided with a biological filler, a variable porous aerator and a wastewater lifting pump. The variable porous aerator communicates with the aerator through a pipeline, and the wastewater lifting pump communicates with the pipeline and then communicates with the separation tank.

In a preferred solution, the separation tank and the membrane tank each are internally provided with an MBR membrane module, an MBR suction pump, a membrane module cleaning pump, a membrane module cleaning dosing pump, and a sludge return pump. The sludge return pump communicates with the pipeline and then communicates with the aerobic tank.

In a preferred solution, a PLC (Programmable logic controller) is used for both sub-controllers and master controller.

By using the technology above, the present disclosure has the beneficial effects compared with the prior art:

The system provided by the present disclosure meets the requirements of influent water quantity, water quality characteristics and effluent water quality standards for sewage treatment, has the characteristics of mature technology, being economical and reasonable, being convenient to operate and being easy to maintain, consumes less power, saves energy, and reduces the processing costs and operation costs.

The system provided by the present disclosure is reasonable in layout and has taken measures as far as possible to reduce the influence on the surrounding environment of the scenic spot, reasonably control noise, odor and solid waste, and prevent secondary pollution, and has also achieved low noise, basically no odor and no influence on the surrounding environment.

The mechanical equipment adopted by the present disclosure has the advantages of stable and reliable operation, high efficiency, convenient management, less maintenance workload, moderate price, and good economic benefit.

DETAILED DESCRIPTION OF VARIOUS EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure.

Figure 1:
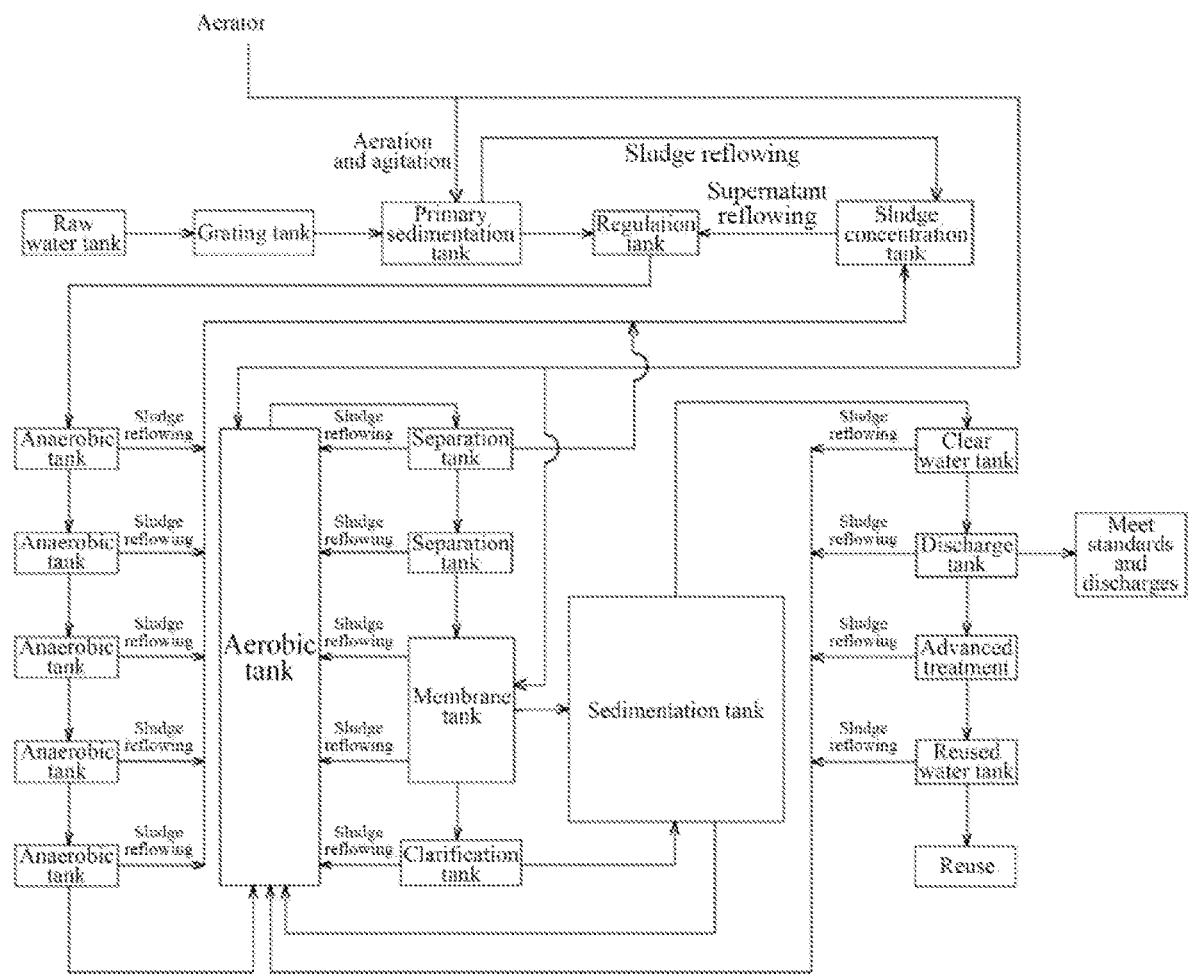
FIG. 1 is a schematic structural diagram of an embodiment of the present disclosure.
Figure 2:
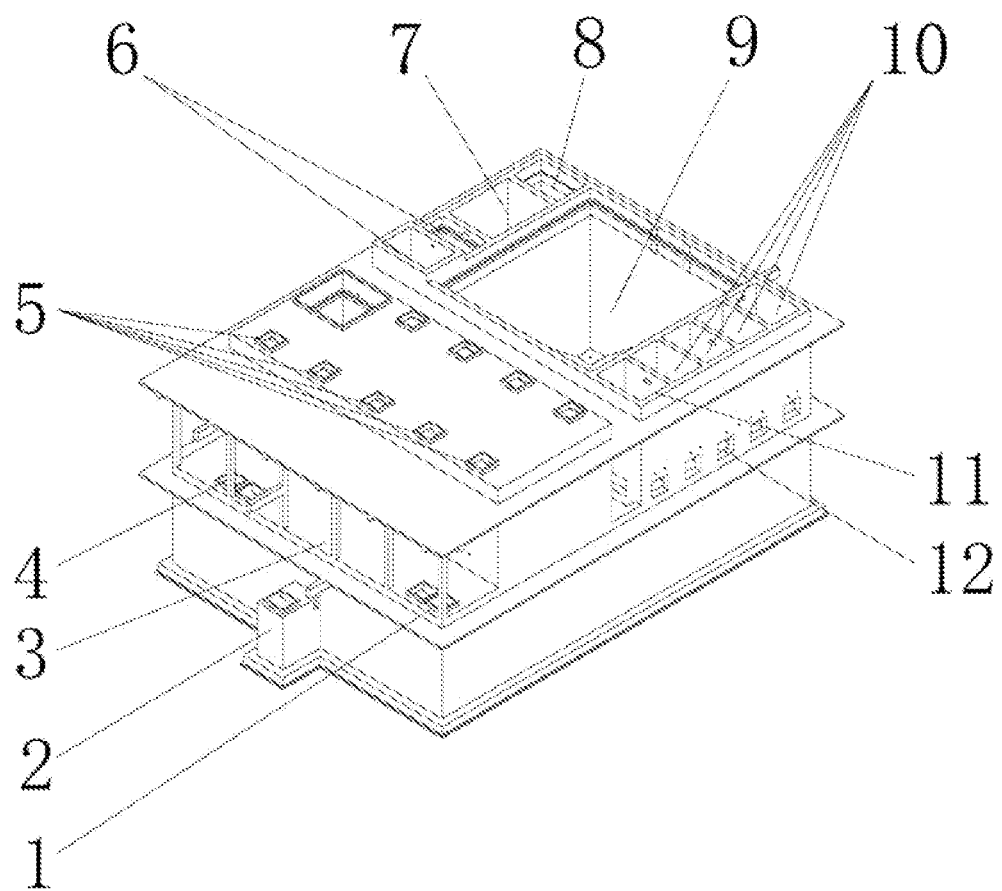
FIG. 2 is a schematic block diagram of an embodiment of the present disclosure.

As shown in FIG. 1 and FIG. 2, a chemical wastewater treatment and reuse system corresponds to a raw water tank, and includes a regulation tank pretreatment system, an A/A/O biological treatment system, an MBR treatment system, and an electrical control system.

The regulation tank pretreatment system includes a grating tank, a primary sedimentation tank 2, and a regulation tank 3 which communicate with the raw water tank 4 in sequence. The regulation tank 3 is internally provided with a heat exchanger and a regulation tank lifting pump, the heat exchanger communicates with an external heat source, and the regulation tank lifting pump communicates with a pipeline and then communicates with an anaerobic tank group.

The A/A/O biological treatment system includes the anaerobic tank group and an aerobic tank group which communicate with the regulation tank in sequence. The anaerobic tank group includes five anaerobic tanks 5 in communication in sequence. The first anaerobic tank is internally provided with an automatic pH regulator, a submersible agitator, an anaerobic sludge return pump, and an ABR reactor, and the rest anaerobic tanks each are internally provided with a submersible agitator, an anaerobic sludge return pump, and an ABR reactor. All anaerobic sludge return pumps communicate with the pipelines and then communicate with the sludge concentration tank. The aerobic tank group includes an aerobic tank, the aerobic tank 12 is internally provided with a biological filler, a variable porous aerator, and a wastewater lifting pump. The variable porous aerator communicates with an aerator through a pipeline, and the wastewater lifting pump communicates with the pipeline and then communicates with the separation tank.

The MBR treatment system includes a separation tank 6 and a membrane tank 7 which communicate with the aerobic tank group in sequence. The membrane tank 7 communicates with a clarification tank 8, and the membrane tank 7 and the clarification tank 8 jointly communicate with a sedimentation tank 9. The sedimentation tank 9 communicates with a clear water tank 10, a discharge tank 11, an advanced treatment tank and a reused tank in sequence.

The electrical control system includes multiple sub-controllers, and the raw water tank, the grating tank, the primary sedimentation tank, the regulation tank 3, the anaerobic tank group, the aerobic tank group, the separation tank, the membrane tank, the clarification tank, the sedimentation tank, the clear water tank, the discharge tank, the advanced treatment tank and the reused water tank respectively correspond to one sub-controller; and all sub-controllers are connected to a master controller. A PLC is used for both sub-controllers and master controller.

In addition to the basic system above, the system further includes an aerator and a sludge concentration tank. The aerator communicates with the bottom of the primary sedimentation tank, the bottom of the aerobic tank and the bottom of the membrane tank through a pipeline; and the aerator is connected to a sub-controller. The sludge concentration tank communicates with the primary sedimentation tank, the anaerobic tank group and the separation tank through a pipeline.

The sludge is returned to the aerobic tank from the separation tank, the membrane tank, the clarification tank, the sedimentation tank, the clear water tank, the discharge tank, the advanced treatment tank and the reused water tank in the system through pipelines.

The separation tank and the membrane tank each are internally provided with an MBR membrane module, an MBR suction pump, a membrane module cleaning pump, a membrane module cleaning dosing pump and a sludge return pump. The sludge return pump communicates with the pipeline and then communicates with the aerobic tank.

The wastewater treatment process is as follows:

The wastewater, after being treated by the grating tank at the previous stage for the removal of large particulate matters and garbage, flows into the regulation tank. The return flow is controlled according to the influent concentration of the regulation tank, thus controlling the CODcr of anaerobic influent at about 10,000. After the wastewater stays in the regulation tank for about 9 hours, the regulation tank plays a role of regulating water quantity, homogenizing water quality, pretreatment, etc., so as to prevent a situation that large water quality fluctuation causes impact on the later anaerobic and aerobic biochemical systems. The heat exchanger is used for temperature regulation in the regulation tank, the water temperature of the anaerobic tank is always kept at about 35° C., thus ensuring the activity of bacteria in the anaerobic tank and improving the reaction speed. The heat source of the heat exchanger may employ RTO waste heat nearby, so as to regulate temperature in the regulation tank.

The wastewater flows into the anaerobic tank, then the alkalinity of the wastewater is regulated by the automatic pH regulator in the anaerobic tank to over 3,000, and the pH of effluent is controlled to about 7.0 to 7.2, thus creating sufficient conditions for strong anaerobic fermentation. After the wastewater stays in the anaerobic tank for 1 day, the wastewater is fully hydrolyzed and acidified to facilitate the bio-metabolic function of methanogens, other anaerobic bacteria and facultative bacteria in the next strong anaerobic process. The wastewater pre-acidified in the previous stage automatically flows into the anaerobic reactor, and the anaerobic reactor employs an ABR reactor for anaerobic biological treatment. In the absence of dissolved oxygen, various complex organic compounds in the wastewater are decomposed into small molecular organic compounds, methane, $CO_2$ gas, ammonia nitrogen, water and inorganic salts through the reproduction and metabolic activities of anaerobic microbes.

Biological fillers and chemicals are added to the anaerobic tank to make microbes form biofilms inside and outside the fillers and chemicals, thus effectively improving the sludge concentration in the anaerobic tank, and enabling the pollutants in wastewater to be in full contact with the microbes to improve the reaction efficiency. The added biological fillers and chemicals are products purchased from the market, which belong to the technology of other enterprises and thus will not be introduced in the present disclosure.

The total staying time of the wastewater in the anaerobic tank in the previous stage is about 5 days. The pollutants, after full anaerobic fermentation, have become biodegradable small molecular substances, other inorganic substances and salts, methane and other gases.

After strong anaerobic treatment, about 80% of COD has been removed from the wastewater, and the wastewater automatically flows into the aerobic tank by gravity, and is subjected to aerobic biochemical treatment to achieve standardized discharge. A contact oxidation method is employed in the aerobic tank, the biological filler is installed in the aerobic tank, and granular biological fillers with an adsorption function are added, thus aerobic biofilms may grow outside the fillers to increase the number of biological florae in the oxidation tank. Due to the adsorption of the filler inside the biological filler, part of organic pollutants can be adsorbed, and meanwhile, the inside of the biological filler is in an anoxic and anaerobic state, which is beneficial to the growth of anaerobic bacteria, further anaerobic hydrolysis of the adsorbed organic matters, and relative increase of anaerobic residence time. The residence time of wastewater in the aerobic tank is about 4 days, and the dissolved oxygen is below 0.5 mg/l by aeration and agitation.

The water after being treated in the aerobic tank flows into the separation tank and the membrane tank, and then flows into the sedimentation tank after passing through the clarification tank. In this process, a membrane in the MBR membrane module has an efficient separation effect, which is much better than that in the traditional sedimentation tank. The treated effluent is extremely clear, suspended solids and turbidity are close to zero, bacteria and viruses are greatly removed, and the effluent quality is stable. Meanwhile, the membrane separation also makes microbes completely trapped in the bioreactor to maintain a higher microbial concentration in the system, which not only improves the overall removal efficiency of pollutants by the reaction device, but also ensures good effluent quality. Meanwhile, the reactor has good adaptability to various changes of influent load (water quality and water quantity) and is resistant to impact load, so that high-quality effluent quality can be stably obtained. Part of the sludge produced during the operation of the system is returned to the anaerobic tank for sludge digestion, and excessive residual sludge is discharged into an original solid-liquid separation system.

PLC used in automatic control can be configured to control the operation of mechanical equipment such as water pumps and aerators, thus achieving unmanned operation of wastewater treatment equipment. The control system employs a full-automatic control system, and the MBR membrane module is provided with an on-line monitoring system to monitor an operation status of the membrane treatment system.

The wastewater treatment process is described in detail in above process, the treated water can be directly discharged or reused in processing production after advanced treatment, and thus a large number of water resources are saved, and the economic benefits are obvious.

The water pump, the aerator, the automatic pH regulator, the ABR reactor, the biological fillers, the chemicals, the MBR membrane module and the like used in the present disclosure are products that can be bought from the market now, so the specific structures and operation principles are not be described in detail.

The system provided by the present disclosure meets the requirements of influent water quantity, water quality characteristics and effluent water quality standards for sewage treatment, has the characteristics of mature technology, being economical and reasonable, being convenient to operate and being easy to maintain, consumes less power, saves energy, and reduces the processing costs and operation costs.

The system provided by the present disclosure is reasonable in layout and has taken measures as far as possible to reduce the influence on the surrounding environment of the scenic spot, reasonably control noise, odor and solid waste, and prevent secondary pollution, and has also achieved low noise, basically no odor and no influence on the surrounding environment.

The mechanical equipment adopted by the present disclosure has the advantages of stable and reliable operation, high efficiency, convenient management, less maintenance workload, moderate price, and good economic benefit.

In the description of the present disclosure, it needs to be understood that the orientation or positional relationship indicated by terms "center", "longitudinal", "transverse", "length", "width", "thickness", "upper", "lower", "front", "back", "left", "right", "vertical", "horizontal", "top", "bottom", "inside", "outside", "clockwise", "counterclockwise" is based on the orientation or positional relationship shown in the drawings only for convenience of description of the present invention and simplification of description rather than indicating or implying that the device or element referred to must have a particular orientation, be constructed and operate in a particular orientation, and thus are not to be construed as limiting the present disclosure.

Furthermore, the terms "first" and "second" are used for descriptive purposes only and are not to be construed as indicating or implying relative importance or implying a number of the indicated technical features. As such, the features limited to "first" and "second" may explicitly or implicitly include one or more of the features. In the description of the present disclosure, "multiple" or "a plurality of" means at least two or more, unless expressly specified otherwise.

The above mentioned is only a preferred specific embodiment of the present disclosure, but the scope of protection of the present disclosure is not limited thereto, the equivalent replacement or changes made by any person skilled in the art according to the technical solution of the present disclosure and its inventive idea within the technical scope disclosed by the present disclosure shall be included in the scope of protection of the present disclosure.

What is claimed is:

1. A chemical sewage treatment and reuse system comprising a raw water tank, a regulation tank pretreatment system, a biological treatment system, an MBR treatment system, and an electrical control system,
   wherein the regulation tank pretreatment system comprises a grating tank, a primary sedimentation tank and a regulation tank which communicate with the raw water tank in sequence;
   the biological treatment system comprises an anaerobic tank group and an aerobic tank group which communicate with the regulation tank in sequence;
   the MBR treatment system comprises a separation tank and a membrane tank that are sequentially connected to the aerobic tank group, the membrane tank communicates with a clarification tank, and the membrane tank and the clarification tank jointly communicate with a sedimentation tank; the sedimentation tank communicates with a clear water tank, a discharge tank, an advanced treatment tank and a reused water tank in sequence;

the electrical control system comprises a plurality of sub-controllers, each tank is connected to one of the plurality of sub-controllers, and all sub-controllers are connected to a master controller.

2. The chemical sewage treatment and reuse system according to claim 1, wherein:

the system further comprises an aerator, the aerator is in pipeline communication with a bottom of the primary sedimentation tank, a bottom of an aerobic tank of the aerobic tank group, and a bottom of the membrane tank; and the aerator is connected to one of the plurality of sub-controllers.

3. The chemical wastewater treatment and reuse system according to claim 2, wherein the system further comprises a sludge concentration tank, and the sludge concentration tank is in pipeline communication with the primary sedimentation tank, the anaerobic tank group and the separation tank.

4. The chemical wastewater treatment and reuse system according to claim 2, wherein the sludge is returned to the aerobic tank from the separation tank, the membrane tank, the clarification tank, the sedimentation tank, the clear water tank, the discharge tank, the advanced treatment tank and the reused water tank in the system through first pipelines.

5. The chemical wastewater treatment and reuse system according to claim 4, wherein the regulation tank is internally provided with a heat exchanger and a regulation tank lifting pump, the heat exchanger communicates with an external heat source, and the regulation tank lifting pump communicates with a second pipeline and then communicates with the anaerobic tank group.

6. The chemical wastewater treatment and reuse system according to claim 5, wherein the anaerobic tank group comprises five anaerobic tanks which are in communication in sequence; a first anaerobic tank of the five anaerobic tanks is internally provided with an automatic pH regulator, a submersible agitator, an anaerobic sludge return pump and an anaerobic baffled reactor, and a remainder of the five anaerobic tanks each are internally provided with a submersible agitator, an anaerobic sludge return pump and an anaerobic baffled reactor; and all anaerobic sludge return pumps communicate with third pipelines and then communicate with the sludge concentration tank.

7. The chemical wastewater treatment and reuse system according to claim 6, wherein the aerobic tank is internally provided with a biological filler, a variable porous aerator and a wastewater lifting pump; the variable porous aerator communicates with the aerator through a fourth pipeline; and the wastewater lifting pump communicates with a fifth pipeline and then communicates with the separation tank.

8. The chemical wastewater treatment and reuse system according to claim 7, wherein the separation tank and the membrane tank each are internally provided with an MBR membrane module, an MBR suction pump, a membrane module cleaning pump, a membrane module cleaning dosing pump and a sludge return pump; and the sludge return pump communicates with a sixth pipeline and then communicates with the aerobic tank.

9. The chemical wastewater treatment and reuse system according to claim 8, wherein a PLC is used for both sub-controllers and master controller.

10. A chemical sewage treatment and reuse system, comprising:

a raw water tank, a regulation tank pretreatment system, a biological treatment system, an MBR treatment system, and an electrical control system, wherein the regulation tank pretreatment system comprises a grating tank, a primary sedimentation tank and a regulation tank which communicate with the raw water tank in sequence;

the biological treatment system comprises an anaerobic tank group and an aerobic tank group which communicate with the regulation tank in sequence;

the MBR treatment system comprises a separation tank and a membrane tank which communicate with the aerobic tank group in sequence, the membrane tank communicates with a clarification tank, and the membrane tank and the clarification tank jointly communicate with a sedimentation tank; the sedimentation tank communicates with a clear water tank, a discharge tank, an advanced treatment tank and a reused water tank in sequence;

the electrical control system comprises a plurality of sub-controllers; each of the raw water tank, the grating tank, the primary sedimentation tank, the regulation tank, the anaerobic tank group, the aerobic tank group, the separation tank, the membrane tank, the clarification tank, the sedimentation tank, the clean water tank, the discharge tank, the advanced treatment tank and the reused water tank is connected to one of the plurality of sub-controllers; and all sub-controllers are connected to a master controller.

11. The chemical sewage treatment and reuse system according to claim 10, further comprising an aerator, wherein the aerobic tank group comprises an aerobic tank, the aerator is in pipeline communication with a bottom of the primary sedimentation tank, a bottom of the aerobic tank and a bottom of the membrane tank; and the aerator is connected to one of the plurality of sub-controllers.

12. The chemical wastewater treatment and reuse system according to claim 11, further comprising a sludge concentration tank, wherein the sludge concentration tank is in pipeline communication with the primary sedimentation tank, the anaerobic tank group and the separation tank.

13. The chemical wastewater treatment and reuse system according to claim 11, wherein the sludge is returned to the aerobic tank from the separation tank, the membrane tank, the clarification tank, the sedimentation tank, the clear water tank, the discharge tank, the advanced treatment tank and the reused water tank through first pipelines.

14. The chemical wastewater treatment and reuse system according to claim 13, wherein the regulation tank is internally provided with a heat exchanger and a regulation tank lifting pump, the heat exchanger communicates with an external heat source, and the regulation tank lifting pump communicates with a second pipeline and communicates with the anaerobic tank group.

15. The chemical wastewater treatment and reuse system according to claim 14, wherein the anaerobic tank group comprises five anaerobic tanks in communication in sequence; a first anaerobic tank of the five anaerobic tanks is internally provided with an automatic pH regulator, a submersible agitator, an anaerobic sludge return pump and an anaerobic baffled reactor therein, and a remainder of the five anaerobic tanks each are internally provided with a submersible agitator, an anaerobic sludge return pump and an anaerobic baffled reactor; and all anaerobic sludge return pumps communicate with third pipelines and the sludge concentration tank.

16. The chemical wastewater treatment and reuse system according to claim 15, wherein the aerobic tank is internally provided with a biological filler, a variable porous aerator and a wastewater lifting pump; the variable porous aerator communicates with the aerator through a fourth pipeline; and the wastewater lifting pump communicates with a fifth pipeline and then communicates with the separation tank.

17. The chemical wastewater treatment and reuse system according to claim 16, wherein the separation tank and the membrane tank each are internally provided with an MBR membrane module, an MBR suction pump, a membrane module cleaning pump, a membrane module cleaning dosing pump and a sludge return pump; and the sludge return pump communicates with a sixth pipeline and then communicates with the aerobic tank.

18. The chemical wastewater treatment and reuse system according to claim 17, wherein a PLC is used for both sub-controllers and master controller.

\* \* \* \* \*